United States Patent Office.

JOHN MURPHY, OF NEW YORK, N. Y.

Letters Patent No. 101,905, dated April 12, 1870.

IMPROVEMENT IN THE MANUFACTURE OF INDIA RUBBER PACKING, BELTING AND HOSE.

The Schedule referred to in these Letters Patent and making part of the same.

*To all whom it may concern:*

Be it known that I, JOHN MURPHY, of the city, county, and State of New York, have made a new and useful Improvement in the Manufacture of Rubber Packing, Belting, and Hose; and I hereby declare the following to be a full and exact description of the same.

My invention relates to that class of rubber manufactures which are made by uniting duck, canvas, or other fabric with rubber or similar vulcanizable compounds; and The invention consists in the use of asbestos in such articles as packing, belting, and hose, so as to improve them greatly.

The following description will enable any one skilled in the art to use my invention in the several classes of articles to which it is applicable.

First, in the manufacture of packing for piston-rods, cylinders, and valves of steam-engines, pumps, and similar machines, such packing has heretofore been made by coating canvas, or other suitable fabric, with rubber compounds, then rolling the fabric around a core of rubber, or other elastic material, so as to form the packing. This is known as Tuck's packing. In general structure I form my packing in the same manner, but instead of a rubber or other core I employ a core made of asbestos, around which the rubber-coated fabric is wound in the usual manner, and vulcanized or not as desired. The packing formed in this manner does not become hard under the influence of heat and pressure, as does that heretofore made, but remains pliable. It does not become heated, owing to the low conducting power of asbestos. I also mix with the rubber compound used in coating the fabric, a portion of ground or disintegrated asbestos. This renders the entire fabric heat-resisting and more durable. In making large sized packing the amount of asbestos may be equal to or greater than the weight of the canvas. But in packing of small size only such an amount of disintegrated asbestos should be used with the rubber compound as can be conveniently spread upon the duck or canvas.

Second, in the manufacture of rubber-belting. This I form in the manner well-known in the trade. My improvement consists in grinding or mixing with the rubber or gum-compound used in coating the canvas, or other fabric, powdered or disintegrated asbestos, as is above described in the manufacture of packing. The belting thus formed will, when vulcanized, have a harder surface without injury to its pliability, and is far more durable. When in use it accumulates less electricity, and is therefore better adapted for use in cotton-spinning where large rubber belts and "aprons" are used.

Third, in the manufacture of rubber and combination hose. In these I mix or grind with the rubber compound, asbestos in the same manner as above mentioned in the manufacture of packing and belting. Hose formed in this manner is especially adapted for conveying steam and hot-water. The compound formed by the union of vegetable fiber, rubber, and asbestos, is so good a non-conductor as to require no other covering in most instances. Asbestos, from its fibrous character, adds to the strength of the fabric with which it is combined, especially when mixed with the vulcanized rubber, as above described. In forming the compound for coating the duck or canvas, I find that I can combine two pounds of disintegrated or pulpy asbestos with from ten to fifteen pounds of rubber. The core of asbestos for packing may be formed either by pressing or twisting, or a pulp of asbestos with other pulpy fibrous or glutinous material may be employed.

For the outside covering of tubes and pipes a much larger amount of asbestos may be mixed with rubber, and in this way a good non-conducting material formed, for preventing the radiation or loss of heat.

Having thus described my invention,

What I claim and desire to secure by Letters Patent of the United States, is—

1. The combination of asbestos, rubber, and canvas or equivalent fabric, so as to form packing, belting, hose, or similar articles, as described.

2. The improved packing, belting, and hose herein described, formed by combining asbestos with the same, during the process of manufacture, as described.

3. A packing for steam-cylinder, valves, pump-pistons, and the like, made by covering a core of asbestos with a rubber-coated fabric, as described.

JOHN MURPHY. [L. S.]

Witnesses:
JUNIUS SCHENCK,
A. C. BENEDICT, Jr.